Figure 1:
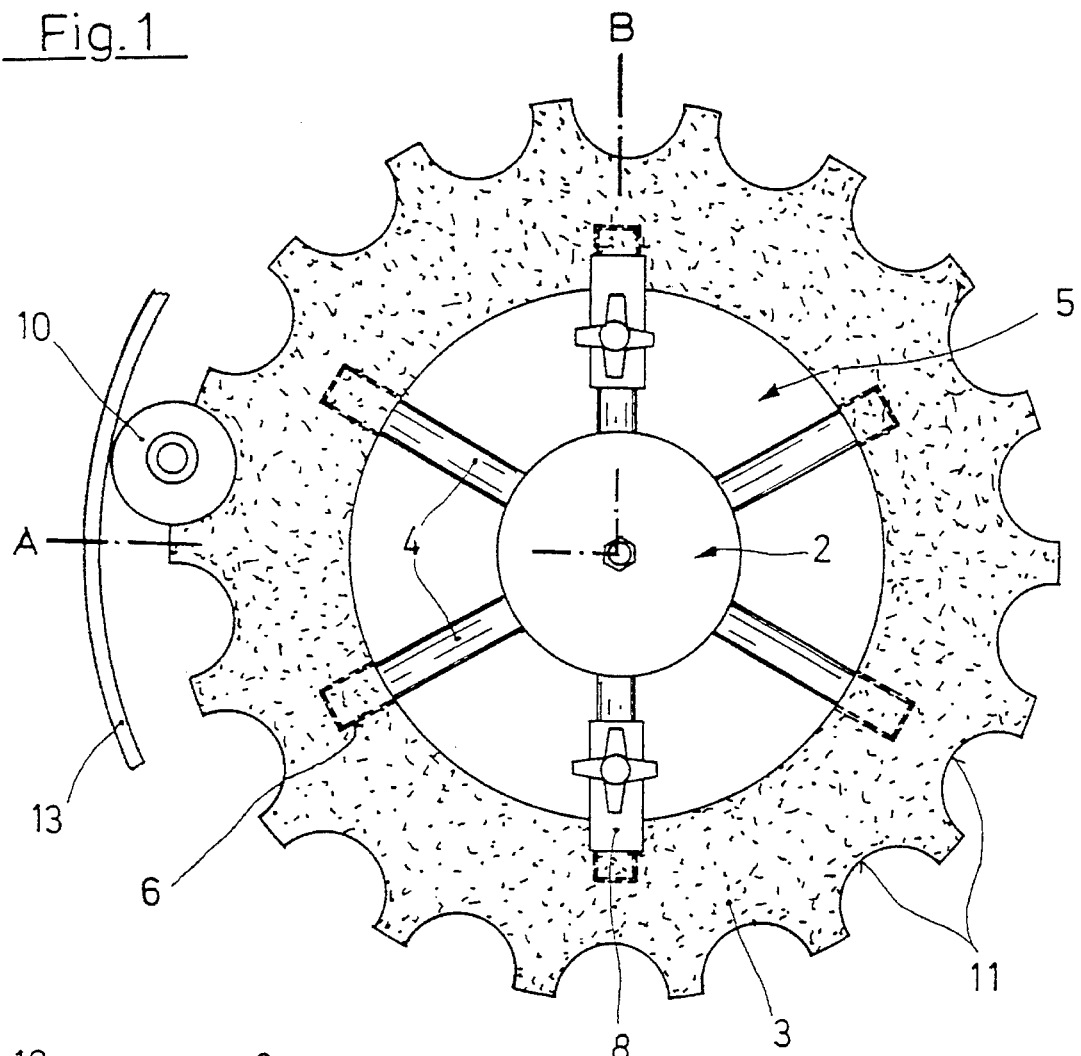

United States Patent [19]

Kronseder

[11] Patent Number: 5,582,285
[45] Date of Patent: Dec. 10, 1996

[54] TRANSPORT DEVICE FOR VESSELS

[76] Inventor: Hermann Kronseder, Regensburger Strasse 42, 93086 Woerth/Donau, Germany

[21] Appl. No.: 307,638

[22] PCT Filed: Jan. 27, 1994

[86] PCT No.: PCT/EP94/00226

§ 371 Date: Sep. 15, 1994

§ 102(e) Date: Sep. 15, 1994

[87] PCT Pub. No.: WO94/16976

PCT Pub. Date: Aug. 4, 1994

[30] Foreign Application Priority Data

Jan. 28, 1993 [DE] Germany ............... 9301126 U

[51] Int. Cl.⁶ ........................................... B65G 47/84
[52] U.S. Cl. ............................................... 198/473.1
[58] Field of Search ................ 198/469.1, 473.1, 198/478.1, 480.1

[56] References Cited

U.S. PATENT DOCUMENTS 5,056,650  10/1991  Kronseder ............... 198/473.1 X
5,082,105   1/1992  Tincati ..................... 198/473.1

FOREIGN PATENT DOCUMENTS 0290074  11/1988  European Pat. Off. .
0316001   5/1989  European Pat. Off. .
0735047  11/1932  France .
1068465   5/1967  United Kingdom .

Primary Examiner—James R. Bidwell
Attorney, Agent, or Firm—Tilton, Fallon, Lungmus & Chestnut

[57] ABSTRACT

The present invention refers to a transport device for vessels comprising a reception hub connected to a drive shaft, and a star collar releasably secured to the reception hub and centered thereon. To considerably reduce the risk of contaminations and infections of the transported vessels without impairing the easy and rapid exchangeability of the star collar, the reception hub (2) is provided with a plurality of extension arms (4) which project therefrom and which are distributed over the circumference thereof, with the star collar (3) resting on the free ends of said extension arms (4).

15 Claims, 1 Drawing Sheet

U.S. Patent

Dec. 10, 1996

5,582,285

TRANSPORT DEVICE FOR VESSELS

The present invention refers to a transport device for vessels.

A transport device of this type is already known in the case of which the reception means has a disk-shaped structural design and is provided with a circular outer edge (EP-OS 316 001). The annular star collar rests on this outer edge in large-area contact therewith, either via the whole inner rim area thereof or via a plurality of projections protruding inwards in a sectorlike fashion, said star collar being held on said outer edge by plurality of locking bars adapted to be actuated individually or in combination. This structural design permits the star collar to be exchanged easily and rapidly, e.g. when change-over to a different vessel diameter is effected, since the complete reception means remains on the drive shaft and since it will, consequently, suffice to manipulate the light-weight star collar.

A disadvantage of this device is, however, the large-area contact zone between the reception means and the star collar, which is not easily accessible to cleaning agents and in which foreign matter may accumulate and germs may form. The risk of contaminations and infections of the vessels conveyed by the known transport device is therefore high, and this prevents said transport device from being used e.g. in plants for aseptically bottling beverages. In the case of the structural design including the star collar with projections protruding inwards, the handiness of the star collar is, moreover, impaired.

It is the object of the present invention to considerably reduce in a transport device of the type mentioned at the beginning the risk of contaminations and infections of the transported vessels without impairing the easy and rapid exchangeability of the star collar.

In accordance with the present invention, this object is achieved by the features disclosed.

In a transport device according to the present invention, the contact zone between the reception means and the star collar is reduced to the areas of contact between the extension arms and the star collar, and, in view of the comparatively low weight of the star collar which is normally made from plastic material, a very small number of and very small dimensions of said areas of contact will suffice. The possibility of an accumulation of foreign matter and of germs will thus essentially be reduced and the cleaning possibilities will be improved. The star collar itself does not need any projections or the like for the purpose of supporting it on the reception means so that a light-weight construction of said star collar can be used and so that easy manipulation thereof will be possible.

Advantageous further developments of the present invention, which all contribute to a solution of the underlying task, are disclosed in the subclaims.

Figure 2:
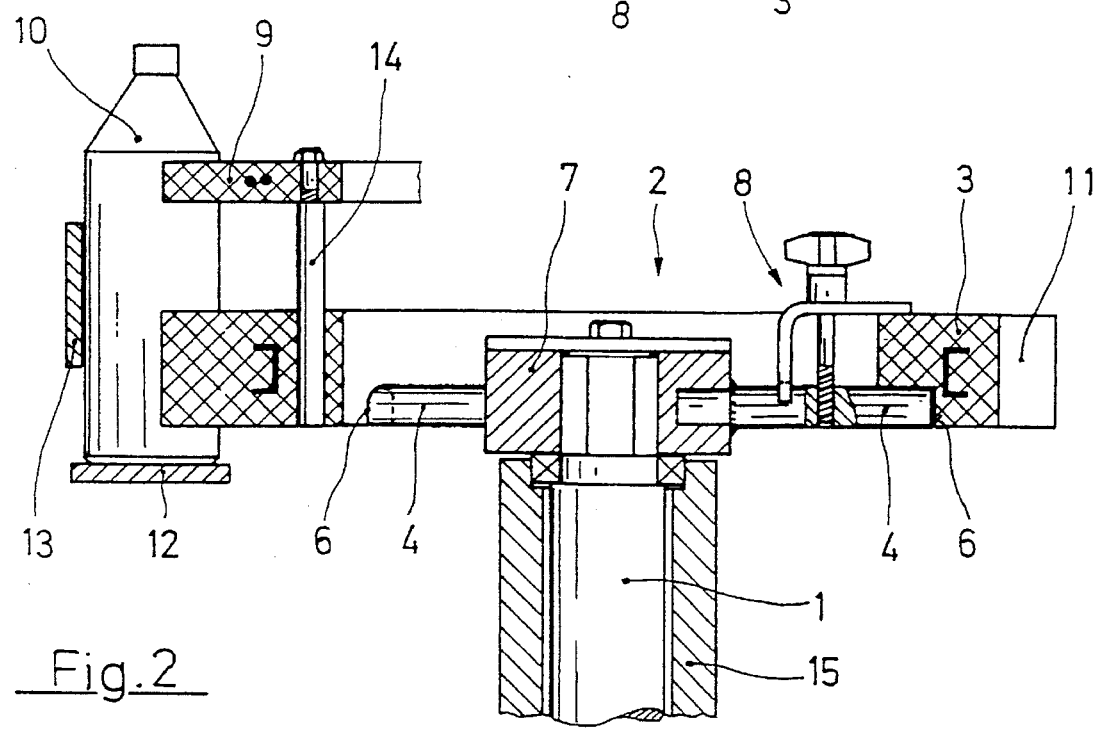

In the following, one embodiment of the present invention will be described on the basis of the drawings, in which:

FIG. 1 shows a top view of a transport device for vessels, FIG. 2 shows section A–B according to FIG. 1.

The transport device according to FIGS. 1 and 2 is integrated in a filling machine, which is not shown in detail, and constructed such that it is adapted to convey upright, empty bottles 10 for beverages.

The transport device comprises a reception means 2 made from metal and a star collar 3 which is releasably secured to said reception means 2 and which is made from plastic material with a metallic support insert. The circumference of the star collar 3 is provided with semicircular star pockets 11 in which the bottles 10 are held by support elements 12 and guide elements 13.

The reception means 2 has a hub 7 which is secured to a vertical drive shaft 1 provided with a bearing flange 15. The circumference of the hub 7 has secured thereto six round rods 4 which are uniformly distributed like spokes and which are radially oriented in a common horizontal plane. The round rods 4 define extension arms on the free outer ends of which the star collar 3 rests in the area of its inner lower rim. The area of the star collar 3 resting on said extension arms is provided with recesses 6 of U-shaped cross-section which are adapted to the contour of said round rods 4, said recesses 6 being constructed as inwards and downwards continuously open recesses and receiving therein the ends of the round rods 4. In combination with said round rods 4, the recesses 6 cause torque transmission and, in addition, automatic centering of the star collar 3 with respect to the axis of rotation of the drive shaft 1. Additional centering or an absorption of bending forces, which act on the star collar 3, can be effected through the outer end faces of the round rods 4 and the surfaces of the recesses 6 located opposite said outer end faces. In order to prevent the star collar 3 from being attached at any incorrect position, one of the round rods 4 is slightly shorter just as the recess 6 associated therewith.

The semicylindrical contact surfaces between the round rods 4 and the star collar 3 are very small in area and they are covered at the top and closed at the bottom so that it is very unlikely that germs or foreign matter will accumulate there and so that this area will easily be accessible to cleaning agents and disinfectants.

Two round rods 4, which are displaced relative to one another by 180°, have arranged thereon fastening means 8 for the star collar 3. These fastening means consist each of a threaded bolt, which is provided with a star grip and which is screwed directly into one of said round rods 4, and of a bent lever actuated thereby, said bent lever resting on the round rod 4 on the one hand and on the upper side of the star collar 3 on the other, whereby said star collar 3 is clamped in position on the reception means 2. When the threaded bolts have been screwed out partially and when the bent levers have been swivelled, the star collar 3 can rapidly and easily be removed from the round rods 4 and replaced by a another star collar.

It goes without saying that also other embodiments are possible as far as the structural design of the fastening means is concerned. Said fastening means can, for example, be arranged on the hub 7. Furthermore, it is possible to use one or several ones of the round rods 4 themselves as a locking bar by inserting said round rods in the hub 7 in a radially displaceable manner and by constructing them such that they are complementary to an adequate blind hole in the star collar 3.

The above-described structural design of a transport device including extension arms which are defined by round rods 4 and which serve to hold the star collar can easily be used for a great variety of star collar diameters by reducing or extending the length of the round rods 4. The free space 5 defined between the round rods 4 and extending between the hub 7 and the inner rim of the star collar 3, through which broken pieces and fragments of vessels can drop unhindered, can be reduced down to a narrow gap, the length of the round rods being then reduced such that a boltlike shape of said round rods will be obtained. Also this structural design shows all the essential advantages of the invention including the low production costs.

As can be seen on the left-hand side of FIG. 2, the star collar 3 can have secured thereto a concentric star ring 9 via freestanding spacer bolts 14. This structural design will be useful when the vessels to be transported are higher vessels. The "germproof" structural design of the transport device will not be impaired by this arrangement, since, due to the fact that the upper star ring 9 is supported by freestanding spacer bolts 14, no additional annular gaps will be formed.

I claim:

1. A transport device for vessels comprising a reception means connected to a drive shaft, a star collar releasably secured to said reception means and centered thereon, said reception means (2) provided with a plurality of extension arms (4) which project therefrom and which are distributed over the circumference thereof, said star collar (3) resting on the free ends of said extension arms (4), whereby a free space (3) is defined between the inner rim of said star collar (3) and said reception means (2), said free space (5) being only interrupted by said extension arms (4).

2. A transport device according to claim 1, wherein said star collar (3) rests exclusively on said free ends of said extension arms (4) and is centered thereon.

3. A transport device according to claim 2, wherein said star collar (3) rests on said free ends of said extension arms (4) in the area of said inner, lower rim.

4. A transport device according to claim 3, wherein said inner rim of said star collar (3) has an essentially rotationally symmetrical structural design.

5. A transport device according to claim 1, 2, 3 or 4, wherein said extension arms (4) are uniformly distributed over the circumference of said reception means (2).

6. A transport device according to claims 1, 2, 3, or 4, wherein three to six of said extension arms (4) are provided.

7. A transport device according to claim 1, wherein said extension arms (4) are arranged essentially radially with respect to the axis of rotation.

8. A transport device according to claim 7, wherein the circumferential distance between two support surfaces defined by neighboring said extension arms (4) and used for supporting said star collar (3) is many times larger than the circumferential dimension of one of said support surfaces.

9. A transport device according to claim 1, 2, 3, 4, 7 or 8, wherein in the area of said inner, lower rim, said star collar (3) is provided with recesses (6) which are open towards the inside and at the bottom thereof and which are engaged by said free ends of said extension arms (4).

10. A transport device according to claim 1, wherein said reception means (2) comprises a hub (7), which is secured to a drive shaft (1), and a plurality of rods (4) or bolts secured to said hub (7), said rods or bolts projecting from said hub like spokes and defining said extension arms which support said star collar (3).

11. A transport device according to claim 10, wherein said rods (4) or bolts defining said extension arms have a circular cross-section.

12. A transport device according to claim 10 or 11, wherein, for the purpose of determining the position of said star collar (3), one of said extension arms (4) and the associated said recess (6) are shorter than the other ones.

13. A transport device according to claim 1, 2, 3, 4, 7, 8, 10, or 11, wherein at least one of said extension arms (4) has arranged thereon a releasable fastening means (8) for said star collar (3).

14. A transport device according to claim 1, 2, 3, 4, 7, 8, 10, or 11, wherein at least one of said extension arms (4) is adapted to be displaced like a locking bar and engages a complementary one of said recesses in said star collar (3) for releasably fixing said star collar (3).

15. A transport device according to claim 1, 2, 3, 4, 7, 8, 10, or 11, wherein said star collar (3) has connected thereto at least one star ring (9) via a plurality of freestanding spacer bolts (14).

* * * * *